(12) United States Patent
Wittorf et al.

(10) Patent No.: US 8,299,637 B2
(45) Date of Patent: Oct. 30, 2012

(54) SHAPE-MEMORY ALLOY-DRIVEN POWER PLANT AND METHOD

(75) Inventors: Marten Wittorf, Ingelheim (DE); Alan L. Browne, Grosse Pointe, MI (US); Nancy L. Johnson, Northville, MI (US); James Holbrook Brown, Costa Mesa, CA (US)

(73) Assignees: GM Global Technology Operations LLC, Detroit, MI (US); Dynalloy, Inc., Costa Mesa, CA (US)

( * ) Notice: Subject to any disclaimer, the term of this patent is extended or adjusted under 35 U.S.C. 154(b) by 426 days.

(21) Appl. No.: 12/639,828

(22) Filed: Dec. 16, 2009

(65) Prior Publication Data

US 2011/0140456 A1    Jun. 16, 2011

(51) Int. Cl.
| | |
|---|---|
| *B60L 1/02* | (2006.01) |
| *F01K 15/00* | (2006.01) |
| *F01K 17/02* | (2006.01) |
| *F02C 6/00* | (2006.01) |
| *F02C 6/18* | (2006.01) |
| *F01B 29/10* | (2006.01) |
| *F02G 1/04* | (2006.01) |

(52) U.S. Cl. ............................................. 290/2; 60/527
(58) Field of Classification Search ......... 290/2; 60/527
See application file for complete search history.

(56) References Cited

U.S. PATENT DOCUMENTS

| | | | | | |
|---|---|---|---|---|---|
| 1,602,068 | A | * | 10/1926 | Daub | 60/527 |
| 3,303,642 | A | * | 2/1967 | Lee, II | 60/530 |
| 3,316,415 | A | * | 4/1967 | Taylor | 290/1 R |
| 3,321,908 | A | * | 5/1967 | Katchalsky et al. | 60/721 |
| 3,403,238 | A | * | 9/1968 | Buehler et al. | 337/393 |
| 4,010,612 | A | * | 3/1977 | Sandoval | 60/527 |
| 4,027,479 | A | * | 6/1977 | Cory | 60/527 |
| 4,150,544 | A | * | 4/1979 | Pachter | 60/527 |
| 4,246,754 | A | * | 1/1981 | Wayman | 60/527 |
| 4,756,158 | A | * | 7/1988 | Arvola et al. | 60/527 |
| 6,006,522 | A | * | 12/1999 | Foss et al. | 60/528 |
| 6,196,811 | B1 | * | 3/2001 | Hasse | 417/321 |
| 6,226,992 | B1 | * | 5/2001 | Kutlucinar et al. | 60/528 |
| 6,367,253 | B2 | * | 4/2002 | Kutlucinar | 60/528 |
| 6,574,958 | B1 | * | 6/2003 | MacGregor | 60/527 |
| 6,796,124 | B2 | * | 9/2004 | Kutlucinar | 60/528 |
| 6,832,477 | B2 | * | 12/2004 | Gummin et al. | 60/527 |
| 6,880,336 | B2 | * | 4/2005 | Howard | 60/527 |
| 6,915,633 | B2 | * | 7/2005 | Kutlucinar | 60/527 |
| 6,938,416 | B1 | * | 9/2005 | Kutlucinar | 60/528 |
| 6,972,659 | B2 | * | 12/2005 | von Behrens et al. | 337/139 |
| 6,981,374 | B2 | * | 1/2006 | von Behrens et al. | 60/527 |
| 7,017,345 | B2 | * | 3/2006 | Von Behrens et al. | 60/527 |
| 7,082,890 | B2 | * | 8/2006 | MacGregor et al. | 116/284 |

(Continued)

*Primary Examiner* — Pedro J Cuevas
(74) *Attorney, Agent, or Firm* — Quinn Law Group, PLLC

(57) ABSTRACT

A power plant configured for converting thermal energy to electricity includes a source of thermal energy provided by a temperature difference between a primary fluid having a first temperature and a secondary fluid having a second temperature that is different from the first temperature. The plant also includes a collector configured for enhancing the temperature difference between the primary and secondary fluids, and a heat engine configured for converting at least some thermal energy to mechanical energy. The heat engine includes a pseudoplastically pre-strained shape-memory alloy disposed in heat exchange relationship with each of the primary and secondary fluids. Further, the plant includes a generator driven by the heat engine and configured for converting mechanical energy to electricity. A method of utilizing a naturally-occurring temperature difference between air and/or water to change a crystallographic phase of the shape-memory alloy to convert the temperature difference into mechanical energy is disclosed.

14 Claims, 4 Drawing Sheets

U.S. PATENT DOCUMENTS

| | | | |
|---|---|---|---|
| 7,093,817 B2 * | 8/2006 | MacGregor et al. | 251/11 |
| 7,117,673 B2 * | 10/2006 | Szilagyi | 60/528 |
| 7,350,762 B2 * | 4/2008 | MacGregor et al. | 251/11 |
| 7,748,405 B2 * | 7/2010 | Ghorbal et al. | 137/596.17 |
| 8,127,543 B2 * | 3/2012 | Von Behrens et al. | 60/527 |
| 8,164,283 B2 * | 4/2012 | Sheahan et al. | 318/376 |
| 8,179,018 B2 * | 5/2012 | Gao et al. | 310/314 |
| 8,188,757 B2 * | 5/2012 | Herrera et al. | 324/691 |
| 8,188,844 B2 * | 5/2012 | Lenneman et al. | 340/407.1 |
| 8,201,850 B2 * | 6/2012 | Browne et al. | 280/801.1 |
| 8,203,818 B2 * | 6/2012 | Pinto et al. | 361/103 |
| 8,205,445 B2 * | 6/2012 | Browne et al. | 60/528 |
| 2011/0094216 A1 * | 4/2011 | Browne et al. | 60/527 |
| 2011/0095531 A1 * | 4/2011 | Menges | 290/44 |
| 2011/0105004 A1 * | 5/2011 | Browne et al. | 454/75 |
| 2011/0120111 A1 * | 5/2011 | Alexander et al. | 60/527 |
| 2011/0120112 A1 * | 5/2011 | Alexander et al. | 60/527 |
| 2011/0120113 A1 * | 5/2011 | Alexander et al. | 60/527 |
| 2011/0120114 A1 * | 5/2011 | Alexander et al. | 60/527 |
| 2011/0120115 A1 * | 5/2011 | Alexander et al. | 60/527 |
| 2011/0120116 A1 * | 5/2011 | Alexander et al. | 60/527 |
| 2011/0120117 A1 * | 5/2011 | Alexander et al. | 60/527 |
| 2011/0120118 A1 * | 5/2011 | Alexander et al. | 60/527 |
| 2011/0120119 A1 * | 5/2011 | Alexander et al. | 60/527 |
| 2011/0121582 A1 * | 5/2011 | Alexander et al. | 290/1 R |
| 2011/0124451 A1 * | 5/2011 | Alexander et al. | 474/139 |
| 2011/0124452 A1 * | 5/2011 | Alexander et al. | 474/139 |
| 2011/0138800 A1 * | 6/2011 | Wittorf et al. | 60/527 |
| 2011/0139395 A1 * | 6/2011 | Browne et al. | 165/41 |
| 2011/0139396 A1 * | 6/2011 | Browne et al. | 165/41 |
| 2011/0165981 A1 * | 7/2011 | Alexander et al. | 474/202 |
| 2011/0179790 A1 * | 7/2011 | Pretorius | 60/641.15 |
| 2012/0109573 A1 * | 5/2012 | Gao et al. | 702/136 |
| 2012/0112473 A1 * | 5/2012 | Glynn | 290/1 R |
| 2012/0137672 A1 * | 6/2012 | Pinto et al. | 60/527 |
| 2012/0139259 A1 * | 6/2012 | Glezer et al. | 290/55 |
| 2012/0139737 A1 * | 6/2012 | Gross et al. | 340/635 |
| 2012/0151913 A1 * | 6/2012 | Foshansky | 60/527 |
| 2012/0156534 A1 * | 6/2012 | Sujan et al. | 429/62 |
| 2012/0161579 A1 * | 6/2012 | Browne et al. | 310/330 |
| 2012/0161921 A1 * | 6/2012 | Browne et al. | 338/2 |

* cited by examiner

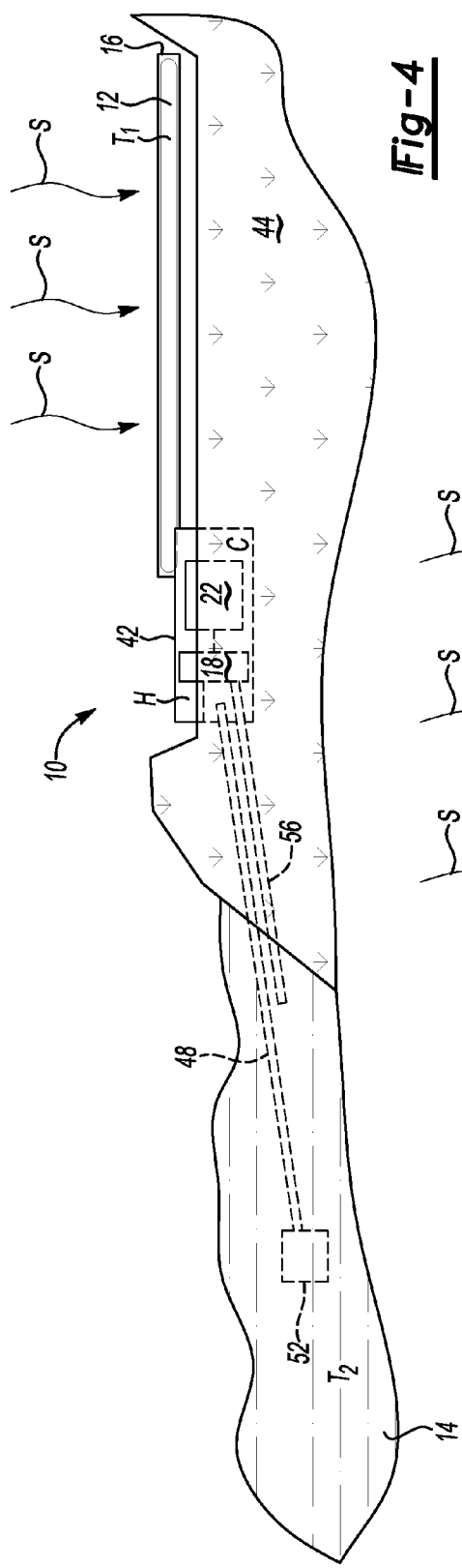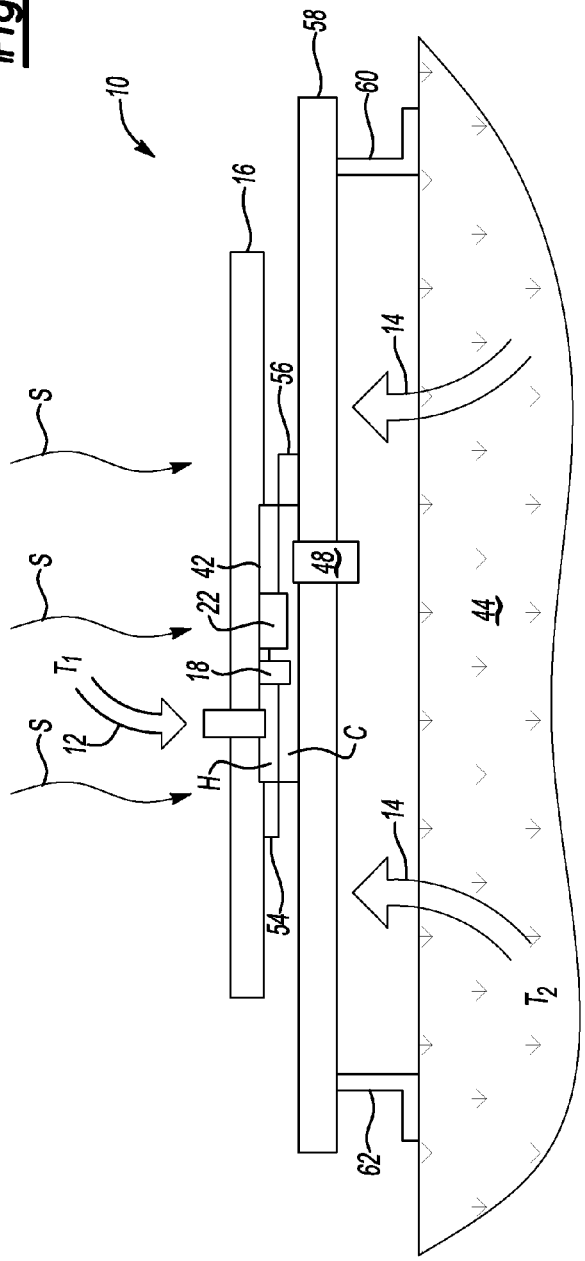

SHAPE-MEMORY ALLOY-DRIVEN POWER PLANT AND METHOD

TECHNICAL FIELD

The present application generally relates to energy conversion, and more specifically, to a power plant for converting thermal energy to electricity and a method of converting a temperature difference into mechanical energy.

BACKGROUND OF THE INVENTION

As demand for electricity continues to rise, power plants configured for generating electricity have become increasingly important. Traditional electrical power plants often include a generator driven by, for example, a water wheel, a diesel engine, or a steam turbine. The generator may then convert one form of energy to another, e.g., to electricity.

Thermal energy is one form of energy that is provided by a temperature difference between objects, regions, and/or fluids. For example, a primary fluid may have a comparatively higher temperature than that of a secondary fluid, and thereby provide a source of thermal energy.

SUMMARY OF THE INVENTION

A power plant configured for converting thermal energy to electricity includes a source of thermal energy. The source of thermal energy is provided by a temperature difference between a primary fluid having a first temperature and a secondary fluid having a second temperature that is different from the first temperature. The power plant also includes a collector configured for enhancing the temperature difference between the primary fluid and the secondary fluid. Further, the power plant includes a heat engine and a generator. The heat engine is configured for converting at least some thermal energy to mechanical energy in a combination which includes a pseudoplastically pre-strained shape-memory alloy disposed in heat exchange relationship with each of the primary fluid and the secondary fluid. The generator is configured for converting mechanical energy to electricity and is driven by the heat engine.

In one variation, the power plant also includes a platform buoyantly disposed in the secondary fluid and configured for supporting at least one of the heat engine, the generator, and the collector for flotation with respect to the secondary fluid.

A method of utilizing a naturally-occurring temperature difference between air and/or water to change a crystallographic phase of a pseudoplastically pre-strained shape-memory alloy to thereby convert the temperature difference into mechanical energy includes orienting the shape-memory alloy sufficiently into a heat transfer relationship with air and/or water having the temperature difference so that the shape-memory alloy sufficiently expands and/or contracts as the shape-memory alloy changes crystallographic phase. The method also includes converting the temperature difference between the air and/or water into mechanical energy.

The power plants and method of the present invention provide excellent conversion of thermal energy to electricity. That is, the power plants harvest thermal energy and generate electricity. The power plants may be land-based or sea-based and may harvest naturally-occurring thermal energy, such as thermal energy between fluids at separate elevations or in separate locations. And, the power plants are operable and can generate electricity in response to minimal temperature differences between fluids.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 4 is a schematic diagram of the power plant of FIG. 1 disposed on land;

FIG. 5 is a schematic diagram of the power plant of FIG. 1 disposed on land and including an isolator spaced opposite and apart from the collector.

DESCRIPTION OF THE PREFERRED EMBODIMENTS

Figure 1:
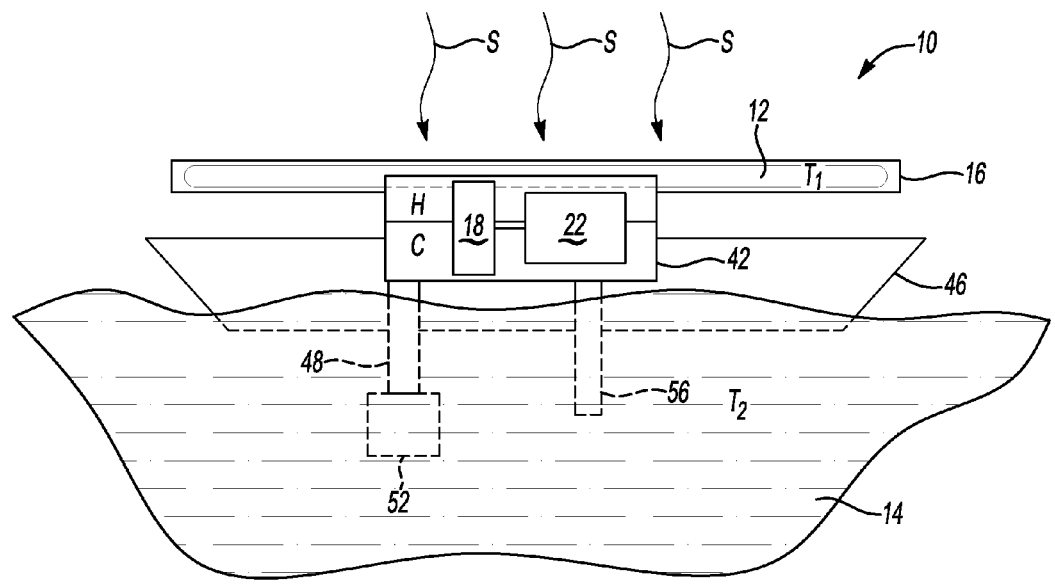
FIG. 1 is a schematic diagram of a power plant buoyantly disposed in a fluid and including a collector, a heat engine, and a generator driven by the heat engine.

Referring to the Figures, wherein like reference numerals refer to like elements, a power plant is shown generally at 10 in FIG. 1. The power plant 10 is configured for harvesting and converting thermal energy to electricity, and therefore may be useful for applications such as, but not limited to, providing electricity to an electrical power grid. Such electricity may likewise be useful for household and industrial applications including lighting homes and businesses, powering industrial facilities, and/or storing reserve electricity for use during peak periods of electricity demand.

Referring now to FIG. 1, the power plant 10 includes a source of thermal energy provided by a temperature difference, $\Delta T$, between a primary fluid 12 having a first temperature, $T_1$, and a secondary fluid 14 having a second temperature, $T_2$, that is different from the first temperature $T_1$. In particular, the first temperature $T_1$ may be higher or different than the second temperature $T_2$. For the power plant 10, the temperature difference $\Delta T$ may be less than or equal to about 300° C. For example, the temperature difference $\Delta T$ between the first temperature $T_1$ and the second temperature $T_2$ may be as little as about 5° C. and no more than about 100° C. Stated differently, the temperature difference $\Delta T$ may be greater than or equal to about 5° C. and less than or equal to about 30° C., e.g., less than or equal to about 10° C.

The primary fluid 12 and the secondary fluid 14 may each be selected from the group of gases, liquids, fluidized beds of solids, and combinations thereof. For example, at least one of the primary fluid 12 and the secondary fluid 14 may be a liquid. Similarly, for some variations such as shown in FIG. 5, at least one of the primary fluid 12 and the secondary fluid 14 may be a gas (indicated by arrows 12 and 14, respectively). Moreover, the primary fluid 12 may have a different form, i.e., phase, than the secondary fluid 14. For example, the primary fluid 12 may be a liquid and the secondary fluid 14 may be a gas. Further, the primary fluid 12 may be the same composition as or different from the secondary fluid 14. In one variation, the primary fluid 12 and the secondary fluid 14 may each be water, but the water of the primary fluid 12 may have a first temperature $T_1$ (FIG. 1) that is higher than the second temperature $T_2$ (FIG. 1) of the water of the secondary fluid 14.

Figure 3:
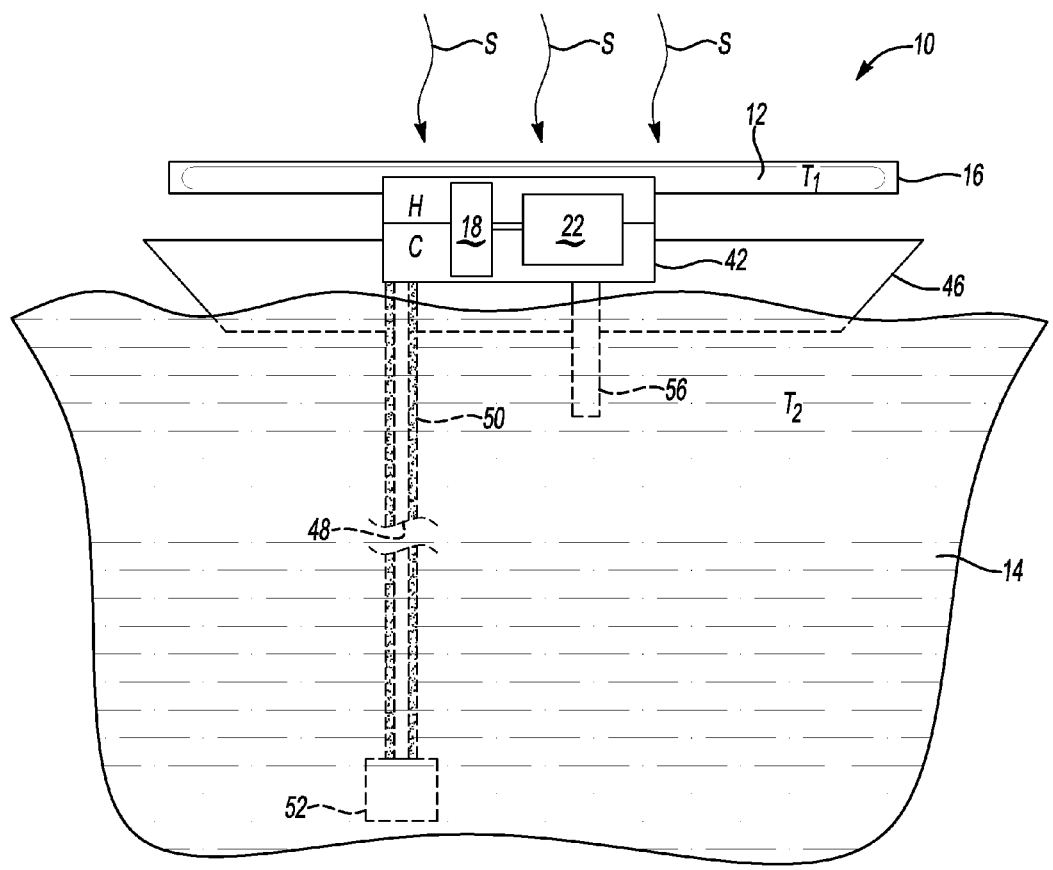
FIG. 3 is a schematic diagram of the power plant of FIG. 1 including a retractable and extendable intake channel.

Referring to FIGS. 1 and 3-6, the source of thermal energy may be land-based (FIGS. 5 and 6), sea-based (FIGS. 1 and 3), or a combination of land- and sea-based (FIG. 4). As used herein, the terminology "sea-based" includes any source of thermal energy present from any body of water, e.g., a river, lake, stream, creek, pond, ocean, puddle, estuary, swamp, marsh, bog, and the like. Similarly, as used herein, the terminology "land-based" includes any source of thermal energy, such as geothermal energy, from any land, e.g., mountains, tundra, desert, grassland, vegetation, plateaus, rocks, decomposing landfills, and the like. More specifically, regardless of whether the source of thermal energy is land-based, sea-based, or a combination of land- and sea-based, the primary fluid 12 and the secondary fluid 14 may be respectively, for example, air at a first elevation and air at a second elevation (FIG. 5), water at a first elevation and air at a second elevation (FIG. 6), or water at a first depth and water at a second depth (FIGS. 1, 3, and 4).

Referring again to FIG. 1, the power plant 10 also includes a collector 16 configured for enhancing the temperature difference $\Delta T$ between the primary fluid 12 and the secondary fluid 14. For example, the collector 16 may accumulate and/or warm the primary fluid 12, and direct the primary fluid 14 to other components of the power plant 10. Likewise, the collector 16 may accumulate and/or cool the secondary fluid 14. For embodiments including water as the primary fluid 12, it is to be appreciated that the collector 16 may be a top-most region of water stratified according to temperature, e.g., a region of water warmed by the sun. The collector 16 may serve as a collection point for at least one of the primary fluid 12 and the secondary fluid 14, and may change at least one of the first temperature $T_1$ and the second temperature $T_2$ to thereby increase the temperature difference $\Delta T$ between the primary and secondary fluids 12, 14. Stated differently, the collector 16 may create the temperature difference $\Delta T$. Therefore, the collector 16 may augment an operating temperature range of the power plant 10 by ensuring an adequate source of thermal energy for operating components of the power plant 10, as set forth in more detail below.

In one variation, the collector 16 may be a solar collector configured for transferring solar energy (indicated by arrows S) to the primary fluid 12. That is, the solar collector 16 may collect and/or focus solar energy and warm the primary fluid 12 to the first temperature $T_1$. Therefore, generally, the solar collector 16 may ensure that the primary fluid 12 has a higher temperature than the second temperature $T_2$ of the secondary fluid 14.

Any solar collector 16 configured for harnessing and transferring solar energy to the primary fluid 12 is suitable. For example, without limitation, the solar collector 16 may be a plurality of solar panels (shown generally in FIGS. 1 and 3-6) configured to contain and/or circulate the primary fluid 12, a plurality of mirrors (not shown), cooling loops of photovoltaic cells (not shown), and combinations thereof. It is to be appreciated that the solar collector 16 may also be a collection and storage system including solar cells, valves, piping, sensors, and the like.

Figure 2:
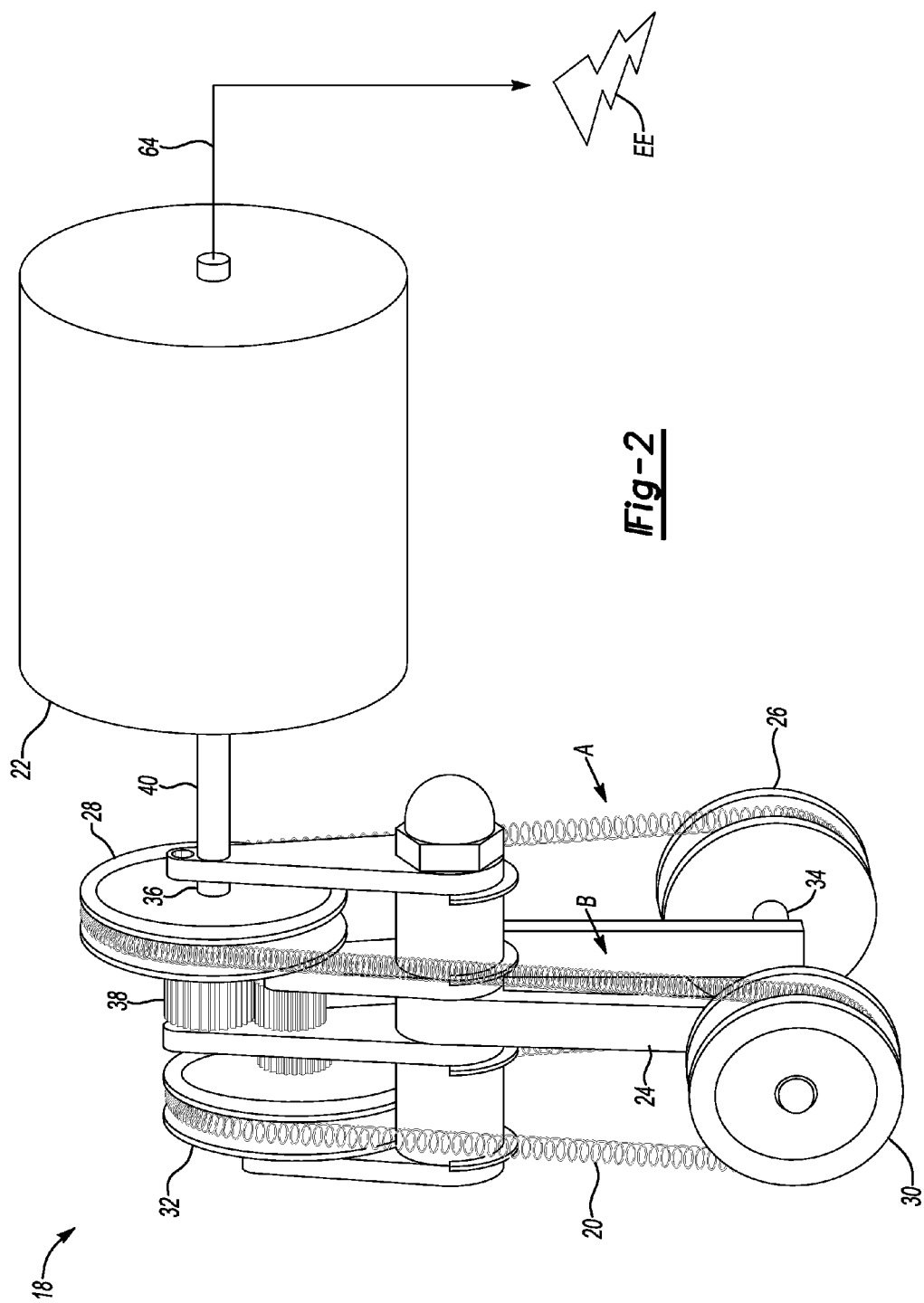
FIG. 2 is a schematic perspective view of the generator and the heat engine for combination within the power plant of FIG. 1.

Referring now to FIGS. 1 and 2, the power plant 10 includes a heat engine 18. The heat engine 18 is configured for converting at least some thermal energy, e.g., heat, to mechanical energy, as set forth in more detail below. More specifically, the heat engine 18 includes a pseudoplastically pre-strained shape-memory alloy 20 (FIG. 2) having a crystallographic phase changeable between austenite and martensite in response to the temperature difference $\Delta T$ between the primary fluid 12 and the secondary fluid 14 (FIG. 1).

The terminology "pseudoplastically pre-strained" refers to stretching the shape-memory alloy element 18 while the shape-memory alloy 20 is in the martensite phase so that the strain exhibited by the shape-memory alloy 20 under loading is not fully recovered when unloaded. That is, upon unloading, the shape-memory alloy 20 appears to have plastically deformed, but when heated to the austenite start temperature, $A_s$, the strain can be recovered so that the shape-memory alloy 20 returns to the original length observed prior to any load being applied. Additionally, the shape-memory alloy 20 may be stretched before installation in the heat engine 18, such that the nominal length of the shape-memory alloy 20 includes that recoverable pseudoplastic strain, which provides the motion used for driving the heat engine 18.

Further, as used herein, the terminology "shape-memory alloy" refers to known alloys which exhibit a shape-memory effect and have the capability to quickly change properties in terms of stiffness, spring rate, and/or form stability. That is, the shape-memory alloy 20 may undergo a solid state phase change via crystalline rearrangement to shift between a martensite phase, i.e., "martensite", and an austenite phase, i.e., "austenite". Stated differently, the shape-memory alloy 20 may undergo a displacive transformation rather than a diffusional transformation to shift between martensite and austenite. In general, the martensite phase refers to the comparatively lower-temperature phase and is often more deformable than the comparatively higher-temperature austenite phase. The temperature at which the shape-memory alloy 20 begins to change from the austenite phase to the martensite phase is known as the martensite start temperature, $M_s$. The temperature at which the shape-memory alloy 20 completes the change from the austenite phase to the martensite phase is known as the martensite finish temperature, $M_f$. Similarly, as the shape-memory alloy 20 is heated, the temperature at which the shape-memory alloy 20 begins to change from the martensite phase to the austenite phase is known as the austenite start temperature, $A_s$. And, the temperature at which the shape-memory alloy 20 completes the change from the martensite phase to the austenite phase is known as the austenite finish temperature, $A_f$.

Therefore, the shape-memory alloy 20 may be characterized by a cold state, i.e., when a temperature of the shape-memory alloy 20 is below the martensite finish temperature $M_f$ of the shape-memory alloy 20. Likewise, the shape-memory alloy 20 may also be characterized by a hot state, i.e., when the temperature of the shape-memory alloy 20 is above the austenite finish temperature $A_f$ of the shape-memory alloy 20.

In operation, i.e., when exposed to the temperature difference $\Delta T$ between the primary fluid 12 and the secondary fluid 14, the shape-memory alloy 20 can change dimension upon changing crystallographic phase to thereby convert thermal energy to mechanical energy. That is, the shape-memory alloy 20 may change crystallographic phase from martensite to austenite and thereby dimensionally contract if pseudoplastically pre-strained so as to convert thermal energy to mechanical energy. Conversely, the shape-memory alloy 20 may change crystallographic phase from austenite to martensite and thereby dimensionally expand if under tensile stress so as to be ready to convert thermal energy to mechanical energy. That is, the shape-memory alloy 20 may dimensionally expand if under stress so as to be ready to convert thermal energy to mechanical energy when heated above the austenite finish temperature $A_f$.

The shape-memory alloy 20 may have any suitable composition. In particular, the shape-memory alloy 20 may include in combination an element selected from the group of cobalt, nickel, titanium, indium, manganese, iron, palladium, zinc, copper, silver, gold, cadmium, tin, silicon, platinum, and gallium. For example, suitable shape-memory alloys 18 may include nickel-titanium based alloys, nickel-aluminum based alloys, nickel-gallium based alloys, indium-titanium based alloys, indium-cadmium based alloys, nickel-cobalt-aluminum based alloys, nickel-manganese-gallium based alloys, copper based alloys (e.g., copper-zinc alloys, copper-aluminum alloys, copper-gold alloys, and copper-tin alloys), gold-cadmium based alloys, silver-cadmium based alloys, manganese-copper based alloys, iron-platinum based alloys, iron-palladium based alloys, and combinations of one or more of each of these combinations. The shape-memory alloy 20 can be binary, ternary, or any higher order so long as the shape-memory alloy 20 exhibits a shape memory effect, e.g., a change in shape orientation, damping capacity, and the like. A skilled artisan, in accordance with this invention, may select the shape-memory alloy 20 according to desired operating temperatures of the power plant 10 (FIG. 1), as set forth in more detail below. In one specific example, the shape-memory alloy 20 may include nickel and titanium.

Further, the shape-memory alloy 20 may have any suitable form, i.e., shape. For example, the shape-memory alloy 20 may be configured as a shape-changing element. That is, the shape-memory alloy 20 may have a form selected from the group including springs, tapes, wires, bands, continuous loops, and/or combinations thereof. Referring to FIG. 2, in one variation, the shape-memory alloy 20 may be formed as a continuous loop spring.

The shape-memory alloy 20 may convert thermal energy to mechanical energy via any suitable manner. For example, the shape-memory alloy 20 may activate a pulley system (shown generally in FIG. 2 and set forth in more detail below), engage a lever (not shown), rotate a flywheel (not shown), engage a screw (not shown), and the like.

Referring again to FIGS. 1 and 2, the power plant 10 also includes a generator 22. The generator 22 is configured for converting mechanical energy to electricity (represented generally by symbol EE in FIG. 2). The generator 22 may be any suitable device for converting mechanical energy to electricity EE. For example, the generator 22 may be an electrical generator that converts mechanical energy to electricity EE using electromagnetic induction, and may include a rotor (not shown) that rotates with respect to a stator (not shown).

Referring to FIG. 2, the generator 22 is driven by the heat engine 18. That is, mechanical energy resulting from the conversion of thermal energy by the shape-memory alloy 20 may drive the generator 22. In particular, dimensional contraction and the dimensional expansion of the shape-memory alloy 20 drives the generator 22.

More specifically, in one variation shown in FIG. 2, the heat engine 18 may include a frame 24 configured for supporting one or more wheels or pulleys 26, 28, 30, 32 disposed on a plurality of axles 34, 36. The wheels or pulleys 26, 28, 30, 32 may rotate with respect to the frame 24, and the shape-memory alloy 20 may be supported by, and travel along, the wheels or pulleys 26, 28, 30, 32. Speed of rotation of the wheels or pulleys 26, 28, 30, 32 may optionally be modified by one or more gear sets 38. Moreover, the generator 22 may include a drive shaft 40 attached to the wheel or pulley 28. As the wheels or pulleys 26, 28, 30, 32 turn or rotate about the respective axles 34, 36 of the heat engine 18 in response to the dimensionally expanding and contracting shape-memory alloy 20, the drive shaft 40 rotates and drives the generator 22.

The generator 22 then generates electricity EE so that mechanical energy is converted to electricity EE.

Referring generally again to FIG. 1, the power plant 10 may have any suitable configuration, shape, and/or size, depending on the desired application requiring a conversion of thermal energy to electricity EE (FIG. 2). For example, the heat engine 18 and the generator 22 may be driveably connected and disposed within a housing 42. The housing 42 may protect the heat engine 18 and the generator 22 from corrosion, exposure to ambient elements, and the like. The housing 42 may be supported by other elements of the power plant 10 (FIGS. 1, 3, and 5), partially submerged in a land mass 44 (FIGS. 4 and 6), and/or supported by (not shown) a land mass such as 44, as set forth in more detail below. In general, the housing 42 may have an interior configured to include a comparatively hot region (represented schematically by area H in FIG. 1) and a comparatively cold region (represented by area C in FIG. 1). The temperature difference ΔT between area H and area C allows for conversion of thermal energy to electricity EE (FIG. 2).

The primary fluid 12 and the secondary fluid 14 may be in contact in the housing 42, or may be separated from one another in the housing 42, so long as the fluids 12, 14 are in a heat exchange relationship, i.e., disposed with respect to each other so as to transfer thermal energy between the primary fluid 12 and the heat engine 18 and/or between the secondary fluid 14 and the heat engine 18.

As shown generally in FIG. 1, the heat engine 18, and more specifically, the shape-memory alloy 20 (FIG. 2) of the heat engine 18, is disposed in heat exchange relationship with each of the primary fluid 12 and the secondary fluid 14. That is, the shape-memory alloy 20 is disposed relative to each of the primary fluid 12 and the secondary fluid 14 so as to react to the first temperature $T_1$ and/or the second temperature $T_2$. For example, the shape-memory alloy 20 of the heat engine 18 may be disposed in contact with the primary fluid 12 and the secondary fluid 14. Therefore, the shape-memory alloy 20 may change crystallographic phase between austenite and martensite when in heat exchange relationship with one of the primary fluid 12 and the secondary fluid 14. For example, when in heat exchange relationship with the primary fluid 12, the shape-memory alloy 20 may change from martensite to austenite. Likewise, when in heat exchange relationship with the secondary fluid 14, the shape-memory alloy 20 may change from austenite to martensite.

Further, the shape-memory alloy 20 may change dimension upon changing crystallographic phase to thereby convert thermal energy to mechanical energy. More specifically, the shape-memory alloy 20 may dimensionally contract if pseudoplastically pre-strained upon changing crystallographic phase from martensite to austenite, and may dimensionally expand if under tensile stress upon changing crystallographic phase from austenite to martensite to thereby convert thermal energy to mechanical energy. Therefore, for any condition wherein the temperature difference ΔT exists between the first temperature $T_1$ (FIG. 1) of the primary fluid 12 and the second temperature $T_2$ (FIG. 1) of the secondary fluid 14, i.e., wherein the primary fluid 12 and the secondary fluid 14 are not in thermal equilibrium, the shape-memory alloy 20 may dimensionally expand and contract upon changing crystallographic phase between martensite and austenite. And, the change in crystallographic phase of the shape-memory alloy 20 is sufficient to drive the generator 22.

The shape-memory alloy 20 has a comparatively smaller energy hysteresis than traditional shape-memory alloys, and is responsive to minimal temperature differences. Consequently, the power plant 10 including the shape-memory alloy 20 can produce comparatively greater output, e.g., mechanical energy and/or electricity EE (FIG. 2), than traditional shape-memory alloys. Stated differently, the power plant 10 has excellent efficiency and converts a maximum amount of thermal energy to mechanical energy and/or electricity EE, even at a temperature difference $\Delta T$ of less than or equal to about 10° C., for example. And, as the temperature difference $\Delta T$ increases, the power plant 10 responds more energetically. That is, for comparatively larger temperature differences $\Delta T$, the power plant 10 may convert thermal energy in a shorter amount of time to produce a comparatively larger amount of mechanical energy and/or electricity EE (FIG. 2).

In operation, with reference to the power plant 10 of FIG. 1 and described with respect to the example configuration of the shape-memory alloy 20 shown in FIG. 2, one wheel or pulley 26 is at least sufficiently immersed in the primary fluid 12 while another wheel or pulley 30 is at least sufficiently immersed in the secondary fluid 14. As one area (generally indicated by arrow A) of the shape-memory alloy 20 dimensionally expands if under tensile stress when in heat exchange relationship with the secondary fluid 14, e.g., when sufficiently immersed in the secondary fluid 14, another area (generally indicated by arrow B) of the shape-memory alloy 20 in heat exchange relationship with the primary fluid 12, e.g., when sufficiently immersed in the primary fluid 12, dimensionally contracts if pseudoplastically pre-strained. Alternating dimensional contraction and expansion of the continuous spring loop form of the shape-memory alloy 20 upon exposure to the temperature difference $\Delta T$ between the primary fluid 12 and the secondary fluid 14 may convert potential mechanical energy to kinetic mechanical energy, and thereby convert thermal energy to mechanical energy. Therefore, for optimal efficiency of the power plant 10, the primary fluid 12 and the secondary fluid 14 are preferably rapidly refreshed to maintain the temperature difference $\Delta T$ between the fluids 12, 14.

Referring again to FIG. 1, the heat engine 18 and the generator 22 may be disposed in any location in the power plant 10 as long as the heat exchange portions of the shape-memory alloy 20 are disposed in sufficient heat exchange contact with a respective primary fluid 12 and secondary fluid 14. Further, the housing 42 may completely encapsulate the heat engine 18 and the generator 22, or the housing 42 may be vented (not shown). That is, the housing 42 may define cavities (not shown) through which electronic components, such as wires, and/or the primary fluid 12 and the secondary fluid 14 may pass. Further, each cavity may include a filter (not shown) configured for removing impurities from the primary fluid 12 and/or the secondary fluid 14.

The primary fluid 12 and the secondary fluid 14 may pass through the housing 42, but may remain separated within the housing 42. For example, the primary fluid 12 may be separated from the secondary fluid 14 by a seal or barrier.

Alternatively, the primary fluid 12 and the secondary fluid 14 may not pass through the housing 42. That is, a portion of the frame 24 (FIG. 2) of the heat engine 18 may extend from the housing 42. That is, one wheel or pulley 26 may be immersed in the primary fluid 12 while another wheel or pulley 30 may be immersed in the secondary fluid 14 external to the housing 42. In this configuration, portions of the shape-memory alloy 20 of the heat engine 18 may therefore protrude from a section of the housing 42 sealed with respect to the fluids 12, 14.

Although not shown, it is also contemplated that the primary fluid 12 and the secondary fluid 14 may be permanently contained by, and separated within, the housing 42. For example, in this arrangement, the primary fluid 12 and the secondary fluid 14 may each be a liquid or a gas that may be heated or cooled by other fluids passing across the housing 42 during operation of the power plant 10. In this arrangement, the housing 42 may be disposed adjacent to other cooling and warming fluids of the power plant 10. Therefore, a comparatively warmer fluid may pass along area H (FIG. 1) while a comparatively cooler fluid passes along area C (FIG. 1) of the power plant 10. The primary fluid 12 and the secondary fluid 14 may thus be warmed and/or cooled by convection or conduction by other cooling and/or warming fluids of the power plant 10. The primary fluid 12 and the secondary fluid 14 may be separated within the housing 42, for example by a physical barrier. And, the heat engine 18 may straddle the barrier so that portions of the shape-memory alloy 20 protrude selectively into each of the primary fluid 12 and the secondary fluid 14.

In one variation, as shown in FIGS. 1 and 3, the power plant 10 includes a platform 46 buoyantly disposed in the secondary fluid 14 and configured for supporting at least one of the heat engine 18, the generator 22, and the collector 16 for flotation with respect to the secondary fluid 14. For example, the platform 46 may be spaced opposite and apart from the collector 16 and float in the secondary fluid 14. Referring to FIG. 1, in one configuration, the heat engine 18 and the generator 22 may be disposed within the housing 42, and the housing 42 may be supported by the platform 46. Likewise, the housing 42 may also support the collector 16. Stated differently, the heat engine 18 and the generator 22 may each be disposed, e.g., sandwiched, between the platform 46 and the collector 16.

Further, the platform 46 may shield the secondary fluid 14 from solar energy to thereby enhance the temperature difference $\Delta T$. That is, the platform 46 may shade a portion of the secondary fluid 14 from sunlight and solar energy, and thereby enhance and/or maintain the temperature difference $\Delta T$ between the first temperature $T_1$ and the second temperature $T_2$.

Referring to FIGS. 1 and 3, it is to be appreciated that the platform 46 may be a hull of a ship. Although not shown, the platform 46 may alternatively be supported by flotation devices or pontoons so as to be buoyantly disposed within the secondary fluid 14. Further, the platform 46 may be fixed within the secondary fluid 14 with respect to a land mass (not shown), i.e., anchored, or may change position with respect to the land mass according to tides and/or steering.

As shown in FIGS. 1 and 3-6, the power plant 10 may further include an intake channel 48 surrounded by the secondary fluid 14 and configured for conveying the secondary fluid 14 to the heat engine 18. The intake channel 48 may convey the secondary fluid 14 to the heat engine 18 via any suitable method. For example, the intake channel 48 may include a pump (not shown). Alternatively, the secondary fluid 14 may be conveyed to the heat engine 18 via capillary action and/or gravity. Further, the intake channel 48 may include piping, valves, pressure regulators, sensors, and combinations thereof to convey the secondary fluid 14 to the heat engine 18.

Further, as shown in FIG. 3, the intake channel 48 may be extendable and retractable with respect to the platform 46. That is, the intake channel 48 may extend to reach comparatively deeper levels of the secondary fluid 14 and/or may retract to reach comparatively shallow levels of the secondary fluid 14. Such extension and retraction allows access to a changeable depth of the secondary fluid 14 according to the desired temperature difference $\Delta T$ between the first temperature $T_1$ and the second temperature $T_2$.

Figure 6:
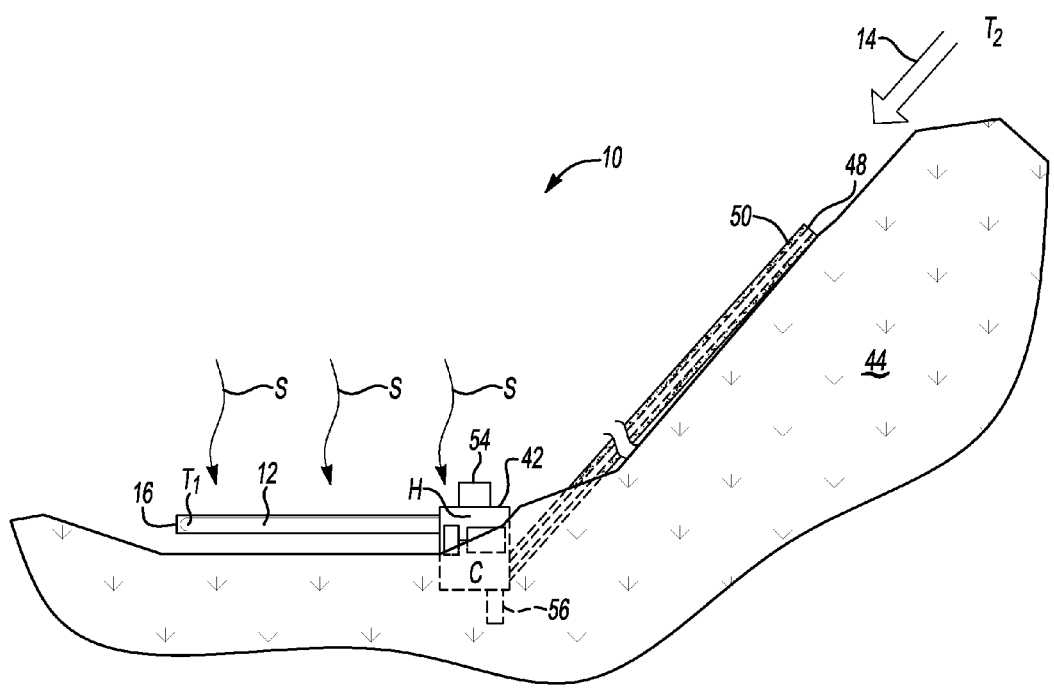
FIG. 6 is a schematic diagram of the power plant of FIG. 1 disposed on land and including an intake channel surrounded by a fluid from an elevated land mass.

As also shown in FIGS. 3 and 6, the intake channel 48 may be insulated from the secondary fluid 14. For example, the intake channel 48 may be wrapped in plastic, foam, and/or metal insulation 50 to minimize temperature changes along a length of the intake channel 48. Since deep ocean water may be comparatively colder than the temperature of surface waters, for example, such insulation 50 ensures that the secondary fluid 14 is conveyed to the heat engine 18 at the relatively constant second temperature $T_2$.

Referring to FIGS. 1, 3, and 4, the intake channel 48 may also include a filter 52 at a proximal end of the intake channel 48 that is configured for protecting the heat engine 18 from impurities in secondary fluid 14. For example, for an application including sea water as the secondary fluid 14, the filter 52 may remove aquatic life and/or sediment.

Additionally, referring to FIGS. 1 and 3-6, the power plant 10 may also include one or more drains 54, 56 configured for removing one or both of the primary fluid 12 and the secondary fluid 14 from heat exchange relationship with the heat engine 18. That is, the primary fluid 12 and/or the secondary fluid 14 may be removed from the housing 42 via the drain 54, 56.

Referring now to FIG. 5, in one variation, the power plant 10 may include an isolator 58. The isolator 58 may be spaced opposite and apart from the collector 16 and is configured for shielding the secondary fluid 14 from solar energy to thereby enhance the temperature difference $\Delta T$. That is, the isolator 58 may shade a portion of the secondary fluid 14 from sunlight and solar energy, and thereby enhance the temperature difference $\Delta T$ between the first temperature $T_1$ and the second temperature $T_2$. For example, for the land-based power plant 10 shown in FIG. 5 including air as the secondary fluid 14, the isolator 58 may include a plurality of legs or supports 60, 62 configured for raising the isolator 58 off the land mass 44. Therefore, the isolator 58 may create a comparatively cooler, shaded secondary fluid 14 which may further enhance and/or maintain the temperature difference $\Delta T$ between the primary fluid 12 and the secondary fluid 14.

In particular, as shown in FIG. 5, at least one of the heat engine 18 and the generator 22 may be supported by the isolator 58. For example, the heat engine 18 and the generator 22 may be disposed within the housing 42, and the housing 42 may be supported by the isolator 58. Likewise, the housing 42 may also support the collector 16. Stated differently, at least one of the heat engine 18 and the generator 22 may each be disposed, e.g., sandwiched, between the isolator 58 and the collector 16.

Although not shown, it is to be appreciated that the power plant 10 may include additional sensing and control components, e.g., an electronic control unit. The electronic control unit may be in operable communication with the power plant 10 and be configured for regulating conversion of thermal energy to electricity EE (FIG. 2). The electronic control unit may be, for example, a computer that electronically communicates with one or more controls and/or sensors of the power plant 10. For example, the electronic control unit may communicate with and/or control one or more of a temperature sensor of the primary fluid 12, a temperature sensor of the secondary fluid 14, a speed regulator of the generator 22, fluid flow sensors, and meters configured for monitoring electricity generation.

Further, as shown in FIG. 2, the power plant 10 may also include a transfer medium 64 configured for conveying electricity EE from the power plant 10, e.g., from the generator 22. The transfer medium 64 may be, for example, a power line or an electrically-conductive cable. The transfer medium 64 may convey electricity EE from the generator 22 to a storage device, e.g., a battery (not shown), an accumulator, and/or a collector, or to an electric power grid of an electric power utility. For example, the power plant 10 may generate, store, and/or covey electricity EE according to fluctuations in demand.

It is to be appreciated that for any of the aforementioned examples or configurations, the power plant 10 may include a plurality of heat engines 18 and/or a plurality of generators 22. That is, one power plant 10 may include more than one heat engine 18 and/or generator 22. For example, one heat engine 18 may drive more than one generator 22. Further, the heat engines 18 and/or generators 22 may be connected in series or in parallel. That is, if a plurality of heat engines 18 are arranged in parallel (not shown), each heat engine 18 may be disposed in contact with a common primary fluid 12. Conversely, if a plurality of heat engines 18 are arranged in series (not shown), the primary fluid 12 of one heat engine 18 may also be the secondary fluid 14 of another heat conversion engine 18.

A method of utilizing a naturally-occurring temperature difference $\Delta T$ between air and/or water to change the crystallographic phase of the pseudoplastically pre-strained shape-memory alloy 20 to thereby convert the temperature difference $\Delta T$ into mechanical energy includes orienting the shape-memory alloy 20 sufficiently into a heat transfer relationship with air and/or water having the temperature difference $\Delta T$. For example, referring generally to FIGS. 2 and 6, one portion (indicated generally by arrow B in FIG. 2) of the shape-memory alloy 20 may be disposed in contact with water, i.e., the primary fluid 12, having the first temperature $T_1$, and while another portion (indicated generally by arrow A in FIG. 2) of the shape-memory alloy 20 may be disposed in contact with air, i.e., the secondary fluid 14, having the second temperature $T_2$. The shape-memory alloy 20 is oriented so that the shape-memory alloy 20 sufficiently expands if under tensile stress and/or contracts if pseudoplastically pre-strained as the shape-memory alloy 20 changes crystallographic phase, as set forth above.

The method further includes converting the temperature difference $\Delta T$ between the air and/or water into mechanical energy. That is, the shape-memory alloy 20 may change crystallographic phase from martensite to austenite and thereby dimensionally contract if pseudoplastically pre-strained so as to convert thermal energy to mechanical energy. Conversely, the shape-memory alloy 20 may change crystallographic phase from austenite to martensite and thereby dimensionally expand if under tensile stress so as to convert thermal energy to mechanical energy.

Further, the method may also include utilizing the conversion of the temperature difference $\Delta T$ into mechanical energy to generate electricity EE (FIG. 2). For example, mechanical energy resulting from the conversion of thermal energy by the shape-memory alloy 20 may be utilized to drive the generator 22. In particular, dimensional contraction and the dimensional expansion of the shape-memory alloy 20 may drive the generator 22 to generate electricity EE (FIG. 2).

Power plants 10 and the method of the present invention provide excellent conversion of thermal energy to electricity EE. That is, power plants 10 harvest thermal energy and generate electricity EE. Power plants 10 may be land-based or sea-based and may harvest any naturally-occurring thermal energy, such as thermal energy between fluids at separate elevations or in separate locations. In particular, power plants 10 may convert naturally-occurring thermal energy based on temperature differences $\Delta T$ between subsurface waters and surface air, between surface air and air at comparatively higher land elevations, between air at a water surface and air at comparatively higher elevations, and/or between air over a land surface and subsurface waters. And, power plants 10 are operable and can generate electricity in response to minimal temperature differences ΔT between fluids 12, 14.

While the best modes for carrying out the invention have been described in detail, those familiar with the art to which this invention relates will recognize various alternative designs and embodiments for practicing the invention within the scope of the appended claims.

The invention claimed is:

1. A power plant configured for converting thermal energy to electricity, the power plant comprising:
    a source of thermal energy provided by a temperature difference between a primary fluid having a first temperature and a secondary fluid having a second temperature that is different from said first temperature;
    a collector configured for enhancing said temperature difference between said primary fluid and said secondary fluid;
    a heat engine configured for converting at least some thermal energy to mechanical energy and including a pseudoplastically pre-strained shape-memory alloy disposed in heat exchange relationship with each of said primary fluid and said secondary fluid;
    a generator configured for converting mechanical energy to electricity and driven by said heat engine;
    a platform buoyantly disposed in said secondary fluid and configured for supporting at least one of said heat engine, said generator, and said collector for flotation with respect to said secondary fluid; and
    an intake channel surrounded by said secondary fluid and configured for conveying said secondary fluid to said heat engine.

2. The power plant of claim 1, wherein said intake channel is extendable and retractable with respect to said platform.

3. The power plant of claim 1, wherein said intake channel is insulated from said secondary fluid.

4. The power plant of claim 1, wherein said intake channel further includes a pump configured for conveying said secondary fluid to said heat engine.

5. The power plant of claim 1, wherein capillary action conveys said secondary fluid through said intake channel to said heat engine.

6. The power plant of claim 1, wherein said collector is a solar collector configured for transferring solar energy to said primary fluid.

7. The power plant of claim 2, wherein said intake channel extends with respect to said platform to reach comparatively deeper levels of said secondary fluid.

8. The power plant of claim 2, wherein said intake channel retracts with respect to said platform to reach comparatively shallow levels of said secondary fluid.

9. The power plant of claim 2, wherein said intake channel accesses a depth of said secondary fluid according to a desired temperature difference between said primary fluid and said secondary fluid.

10. The power plant of claim 2, further including a filter disposed at a proximal end of said intake channel and configured for protecting said heat engine from impurities in said secondary fluid.

11. The power plant of claim 3, wherein said secondary fluid is conveyed to said heat engine so that said second temperature is substantially constant.

12. The power plant of claim 3, wherein said intake channel is wrapped in an insulation so that said second temperature is substantially constant along a length of said intake channel.

13. A power plant configured for converting thermal energy to electricity, the power plant comprising:
    a source of thermal energy provided by a temperature difference between a primary fluid having a first temperature and a secondary fluid having a second temperature that is different from said first temperature;
    a collector configured for enhancing said temperature difference between said primary fluid and said secondary fluid;
    a heat engine configured for converting at least some thermal energy to mechanical energy and including a pseudoplastically pre-strained shape-memory alloy disposed in heat exchange relationship with each of said primary fluid and said secondary fluid;
    a generator configured for converting mechanical energy to electricity and driven by said heat engine;
    a platform buoyantly disposed in said secondary fluid and configured for supporting at least one of said heat engine, said generator, and said collector for flotation with respect to said secondary fluid; and
    an intake channel surrounded by said secondary fluid and configured for conveying said secondary fluid to said heat engine, wherein said intake channel is insulated from said secondary fluid, and is extendable and retractable with respect to said platform so that said intake channel accesses a depth of said secondary fluid according to a desired temperature difference between said primary fluid and said secondary fluid.

14. A power plant configured for converting thermal energy to electricity, the power plant comprising:
    a source of thermal energy provided by a temperature difference between a primary fluid having a first temperature and a secondary fluid having a second temperature that is different from said first temperature;
    a collector configured for enhancing said temperature difference between said primary fluid and said secondary fluid, wherein said collector is a solar collector and transfers solar energy to said primary fluid;
    a heat engine configured for converting at least some thermal energy to mechanical energy and including a pseudoplastically pre-strained shape-memory alloy disposed in heat exchange relationship with each of said primary fluid and said secondary fluid;
    a generator configured for converting mechanical energy to electricity and driven by said heat engine;
    a platform buoyantly disposed in said secondary fluid and configured for supporting at least one of said heat engine, said generator, and said collector for flotation with respect to said secondary fluid; and
    an intake channel surrounded by said secondary fluid and configured for conveying said secondary fluid to said heat engine, wherein said intake channel includes a pump configured for conveying said secondary fluid to said heat engine.

* * * * *